US010908926B2

(12) United States Patent
Coven et al.

(10) Patent No.: US 10,908,926 B2
(45) Date of Patent: Feb. 2, 2021

(54) PLUG-IN MANAGEMENT WRAPPERS

(71) Applicant: Box, Inc., Redwood City, CA (US)

(72) Inventors: Andrew Coven, Los Gatos, CA (US); Benjamin John Kus, Alameda, CA (US); Faizan N. Buzdar, Redwood City, CA (US); Karthik Shanmugasundaram, San Jose, CA (US); Yang Hu, Redwood City, CA (US); Matthew Self, Emerald Hills, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/125,607

(22) Filed: Sep. 7, 2018

(65) Prior Publication Data
US 2019/0079780 A1    Mar. 14, 2019

Related U.S. Application Data

(60) Provisional application No. 62/691,549, filed on Jun. 28, 2018, provisional application No. 62/569,859, (Continued)

(51) Int. Cl.
*G06F 9/445* (2018.01)
*G06N 5/02* (2006.01)
*G06F 9/54* (2006.01)

(52) U.S. Cl.
CPC ...... *G06F 9/44526* (2013.01); *G06F 9/44505* (2013.01); *G06F 9/542* (2013.01); *G06N 5/02* (2013.01)

(58) Field of Classification Search
None
See application file for complete search history.

(56) References Cited

U.S. PATENT DOCUMENTS

2004/0177352 A1* 9/2004 Narayanaswamy ...... G06F 8/61
                                                              717/169
2006/0277537 A1* 12/2006 Chan ........................ G06F 8/65
                                                              717/168

(Continued)

OTHER PUBLICATIONS

"Plugins API—Docker Plugin API" (Nov. 7, 2015), URL:https://docs.docker.com/engine/extend/plugin_api/ (Publication date based on indicated capture date by Archive.org; first publication date unknown).

(Continued)

*Primary Examiner* — Charles E Anya
(74) *Attorney, Agent, or Firm* — Vista IP Law Group, LLP

(57) ABSTRACT

Systems for fine-grained management of plug-ins. A method embodiment commences upon identifying a plug-in to perform a particular computing function in a computing environment. A set of configuration parameters that correspond to the particular computing function are determined. Based at least in part on the determined configuration parameters, an instance-specific plug-in management wrapper corresponding is generated. The instance-specific plug-in management wrapper includes fine-grained management controls so as to be able to observe performance characteristics, functional characteristics and other runtime characteristics of the plug-in while it operates in the computing system. When a particular plug-in is invoked, its management wrapper is automatically generated so as to encapsulate the particular plug-in. Deployment instructions are generated to instantiate the plug-in management wrapper and its encapsulated plug-in in the computing system. When the plug-in has performed its function, any measurements taken by the management wrapper are saved and the generated management wrapper is destroyed.

17 Claims, 11 Drawing Sheets

Related U.S. Application Data filed on Oct. 9, 2017, provisional application No. 62/556,395, filed on Sep. 9, 2017.

(56) References Cited

U.S. PATENT DOCUMENTS

| | | | | |
|---|---|---|---|---|
| 2010/0251034 A1* | 9/2010 | Zhang | ................ | G06F 11/0775 |
| | | | | 714/48 |
| 2014/0325486 A1* | 10/2014 | Zhang | ................ | G06F 11/3692 |
| | | | | 717/125 |
| 2017/0212747 A1* | 7/2017 | Austel | ..................... | G06F 8/65 |
| 2018/0322136 A1* | 11/2018 | Carpentier | ............ | G06F 16/168 |

OTHER PUBLICATIONS

"Amazon API Gateway" (Jul. 10, 2015), URL:https://aws.amazon.com/api-gateway/ (Publication date based on indicated capture date by Archive.org; first publication date unknown).

Docker (software), Wikipedia.com, URL:https://en.wikipedia.org/wiki/Docker_(software), Aug. 21, 2017.

"Linux Container", Wikipedia.com, URL:https://pve.proxmox.com/wiki/Linux_Container, Jul. 4, 2017.

Keyvan Fatehi, "Docker in Docker", github.com, URL:https://github.com/moby/moby/wiki/Docker-in-Docker, May 20 2014.

"Docker Plugin API" (Mar. 13, 2019), dockers.com, URL:https://docs.docker.com/v17.09/engine/extend/plugin_api/ (Publication date based on indicated capture date by Archive.org; first publication date unknown).

* cited by examiner

PLUG-IN MANAGEMENT WRAPPERS

CROSS-REFERENCE TO RELATED APPLICATIONS

The present application claims the benefit of priority to U.S. Provisional Patent Application No. 62/556,395 titled "Self-Learning Plug-In Management Wrappers", filed on Sep. 9, 2017, U.S. Provisional Patent Application No. 62/569,859 titled "Framework Architecture for Integrating Data Processing Technologies with a Cloud-Based Collaboration Platform", filed on Oct. 9, 2017, and U.S. Provisional Patent Application No. 62/691,549 titled "Framework Architecture for Integrating Data Processing Technologies with a Cloud-Based Collaboration Platform", filed on Jun. 28, 2018, all of which are hereby incorporated by reference in their entirety.

FIELD

This disclosure relates to computing system management, and more particularly to techniques pertaining to instance-specific plug-in management wrappers used in collaboration systems.

BACKGROUND

In modern computing environments, plug-ins can be deployed to perform one or more functions or categories of work for users or "tenants". Such plug-ins often comprise code modules that are designed specifically for a particular computing environment to perform the functions or categories of work in that particular computing environment. In many cases, multiple instantiations of a plug-in might be deployed into a computing environment (e.g., one instance per user, or one instance per tenant). As an example, a particular tenant (e.g., an enterprise) of a cloud computing environment might make available many different plug-ins (e.g., SQL server plug-in, virtual desktop plug-in, Hadoop query engine plug-in, etc.) to any or all authorized clients (e.g., users or processes) associated with the tenant. As the number of deployed plug-ins and clients calling the plug-ins increase in a computing environment, the importance of the plug-in performance also increases. As such, an administrator of the computing environment might desire to manage (e.g., monitor, analyze, adjust, etc.) the performance and/or other characteristics of the plug-ins. In some cases, the administrator might desire to manage each individual instance of the plug-ins in order to achieve better performance and/or resource utilization.

Unfortunately, legacy techniques for deploying plug-ins in a computing environment fail to facilitate instance-specific and/or other fine-grained management of plug-in instances. Rather, legacy techniques often configure plug-in instances merely to provide integration "hooks" into the target computing environment. Legacy techniques fail to take into account the specific purpose of calls to the plug-in instance and/or aspects of the then-current computing conditions when the plug-in instance is executed.

With such coarse-grained approaches, a call to a plug-in instance to, for example, generate a set of outputs might allocate (and be charged for) far more on-demand/(e.g., high-cost) computing resources than are actually needed for generating the outputs as compared to the costs if the generation had been performed using background or batch resources (e.g., at a lower cost). Worse, the next instantiation of the same plug-in might again allocate (and again be charged for) far more expensive computing resources than are actually needed.

As another example, a call to the plug-in instance to deliver on-demand outputs might allocate an insufficient amount of computing resources to deliver the outputs in real time. Other aspects of plug-in execution control (e.g., security, metering, resource usage monitoring, etc.) are also limited to the coarse-grained controls configured with the plug-in. What is needed is a technological solution that provides fine-grained management of plug-in instances that are deployed in a computing environment.

SUMMARY

The present disclosure describes techniques used in systems, methods, and in computer program products for instance-specific plug-in management wrappers, which techniques advance the relevant technologies to address technological issues with legacy approaches. More specifically, the present disclosure describes techniques used in systems, methods, and in computer program products for instantiation of plug-ins with instance-specific plug-in management wrappers that facilitate fine-grained plug-in management capabilities. Certain embodiments are directed to technological solutions for encapsulating a plug-in in an instance-specific plug-in management wrapper to form a managed plug-in instance that is instantiated in a computing environment in a manner that achieves continuous improvements in computing task outcomes.

The disclosed embodiments modify and improve over legacy approaches. In particular, the herein-disclosed techniques provide technical solutions that address the technical problems attendant to fine-grained management of plug-in instances that are deployed in a computing environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. More particularly, many management capabilities a management wrapper serve to deliver continuous fine-tuning with respect to resource utilization (e.g., decreased computing resource demands), and continuous fine-tuning with respect to performance (e.g., increased client-server responsivity), as well as other improvements with respect to computing task outcomes.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high performance computing as well as advances in various technical fields related to management of cloud computing resources.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
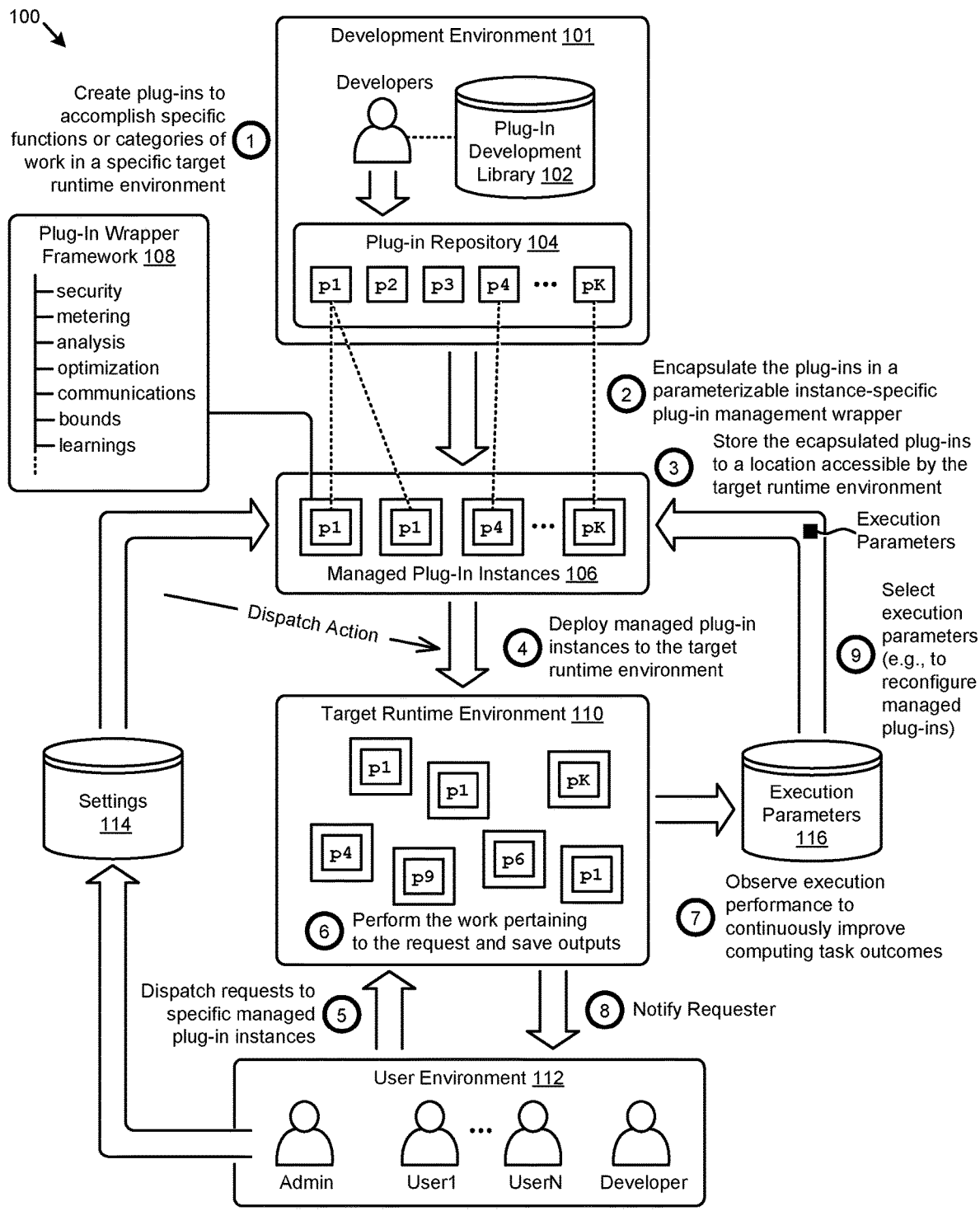
FIG. 1 illustrates a computing environment in which embodiments of the present disclosure can be implemented, according to an embodiment.

Embodiments in accordance with the present disclosure address the problem of fine-grained management of plug-in instances that are deployed in a computing environment. Some embodiments are directed to approaches for encapsulating a plug-in in an instance-specific plug-in management wrapper to form a managed plug-in instance that is instantiated in a computing environment in a manner that achieves continuous improvements in computing task outcomes. The accompanying figures and discussions herein present example environments, systems, methods, and computer program products for instantiation of plug-ins with instance-specific plug-in management wrappers to facilitate fine-grained plug-in management.

Overview

Disclosed herein are techniques for encapsulating a plug-in in an instance-specific plug-in management wrapper to form a managed plug-in instance that is invoked in a computing environment for a specific computing purpose. The instance-specific plug-in management wrappers facilitate fine-grained management of each respective plug-in instance with respect to the specific computing purpose. In certain embodiments, a plug-in management wrapper for a particular plug-in is configured based at least in part on a set of administrative and/or developer settings. A plug-in is a combination of executable code (e.g., binary code, bytecode, Java code, JavaScript, etc.) and non-executable data (e.g., images, rules, configuration settings, etc.). A plug-in is organized to be able to be added to a preexisting module. A preexisting module can accept any number of plug-ins. Any plug-in can be added to or encapsulated in the configured plug-in management wrapper and instantiated in the computing environment. Parameterized client requests corresponding to the specific purpose of the managed plug-in instance are dispatched to the managed plug-in instance for execution. During execution of the managed plug-in instance, one or more wrapper components in the plug-in management wrapper collect execution event observations and perform various analysis tasks over those observations. The observed execution events are used to configure the plug-in management wrappers corresponding to later instantiations of the managed plug-in so as to improve computing task outcomes. In certain embodiments, the wrapper components comprise a security component to implement various access control techniques that are invoked based at least in part on instance-specific execution conditions and/or request parameters. In certain embodiments, the wrapper components comprise a metering component to implement various metering techniques that are invoked based at least in part on instance-specific execution conditions and/or request parameters. In certain embodiments, the wrapper components comprise an optimization component to implement various runtime optimization techniques that are invoked based at least in part on instance-specific execution conditions and/or request parameters.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments"

refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

The computing environment 100 comprises a development environment 101 in which developers create various plug-ins to perform respective categories of work in a target runtime environment 110 (operation 1). The developers access a plug-in development library 102 (e.g., a software development kit) to facilitate development of plug-ins that can operate within the target runtime environment 110. The developed plug-ins (e.g., p1, p2, p3, p4, pK) are published to a plug-in repository 104 to make the plug-ins accessible for deployment in the target runtime environment 110. As earlier mentioned, however, coarse-grained approaches for deploying plug-ins fail to facilitate instance-specific and/or other fine-grained management of plug-in instances. As disclosed herein, coarse-grained approaches can be improved to go beyond merely providing integration "hooks" into the target computing environment. For example, the plug-in development library 102 might provide integration hooks that are designed for specific computing functions or purposes. Further, as disclosed herein, coarse-grained approaches can be improved by integrating modules that behave differently based on a specific purpose or based on specific environmental conditions that are observable contemporaneous with an invocation and execution of the plug-in instance. Such modules can monitor aspects of then-current computing conditions when the plug-in instance is executed, and can and modify aspects of the target computing system based on rules and/or predictions. Other aspects of plug-in execution control (e.g., security, metering, resource usage monitoring, etc.) can be built into the plug-in and/or into an encapsulating management wrapper.

The herein disclosed techniques provide fine-grained management of plug-in instances that are deployed in a computing environment. Specifically, and as can be observed in FIG. 1, the plug-ins selected from plug-in repository 104 are encapsulated in parameterized, instance-specific plug-in management wrappers to form a set of managed plug-in instances 106 (operation 2) that are stored in locations that are accessible to the target runtime environment (operation 3). At some later moment, a dispatch action raised for any reason, possibly in response to a dispatch request raised by a user, one or more of the parameterized, instance-specific plug-in management wrappers are deployed to the target runtime environment 110 (operation 4) and made ready for execution. At the time of initial invocation and/or at the time of any subsequent invocation, a particular instance-specific plug-in management wrapper is specifically configured for each deployed managed plug-in instance in accordance with the computing purpose for that particular managed plug-in instance. For example, one instance of a wrapped file conversion plug-in might have a respective wrapper that is configured for performing on-demand thumbnail generation, while another instance of a wrapped file conversion plug-in might have a respective wrapper that is configured for background thumbnail generation.

The instance-specific plug-in management wrappers perform various operations that facilitate fine-grained management of their respective plug-ins. As depicted in plug-in wrapper framework 108, such operations can pertain to plug-in security, metering, analysis, optimization, communications, and/or other aspects of plug-in execution. As also shown in plug-in wrapper framework 108, the instance-specific plug-in management wrappers can further facilitate compliance with certain bounds or constraints, or certain learnings (e.g., from a learning model). Such bounds, for example, might correspond to a set of administrative and/or developer settings 114 established by an administrator or developer from a user environment 112. The learnings might be derived from a set of execution parameters 116 that correspond to earlier instantiations of the managed plug-in instances in the target runtime environment 110.

When users (e.g., user1, userN) from the user environment 112 issue requests associated with the category of work for a particular plug-in, the requests are dispatched to the managed plug-in instances that are configured to specifically handle the respective requests (operation 5). The requests are executed at the called managed plug-in instances. The work pertaining to the request is performed and outputs are saved (operation 6). The requestor is notified of completion of the work corresponding to the request (operation 8). During execution of the request at each managed plug-in instance, certain execution characteristics (e.g., resource usage, execution times, etc.) are observed at the instance-specific plug-in management wrapper to continuously improve the outcomes of the computing tasks performed at the managed plug-in instance (operation 7). As shown, such execution characteristics can be codified in the execution parameters 116 that, in turn, can be used in later instance-specific plug-in management wrapper configurations (operation 9).

One example of use of execution parameters 116 occurs in "chaining" operations where a plug-in or its management wrapper registers to receive notifications when certain execution events have been accomplished by another plug-in or its management wrapper. The plug-in or its management wrapper that receives the notification can use any one or more of the execution parameters in subsequent operations such as to modify its own or another management wrapper configuration.

The components of the instance-specific plug-in management wrapper can perform various other operations during execution at the managed plug-in instance. Such operations include plug-in access control, plug-in resource usage, plug-in access efficiency, plug-in functional scope and robustness, plug-in garbage collection, plug-in usage reporting, and/or other improvement areas.

Figure 2:
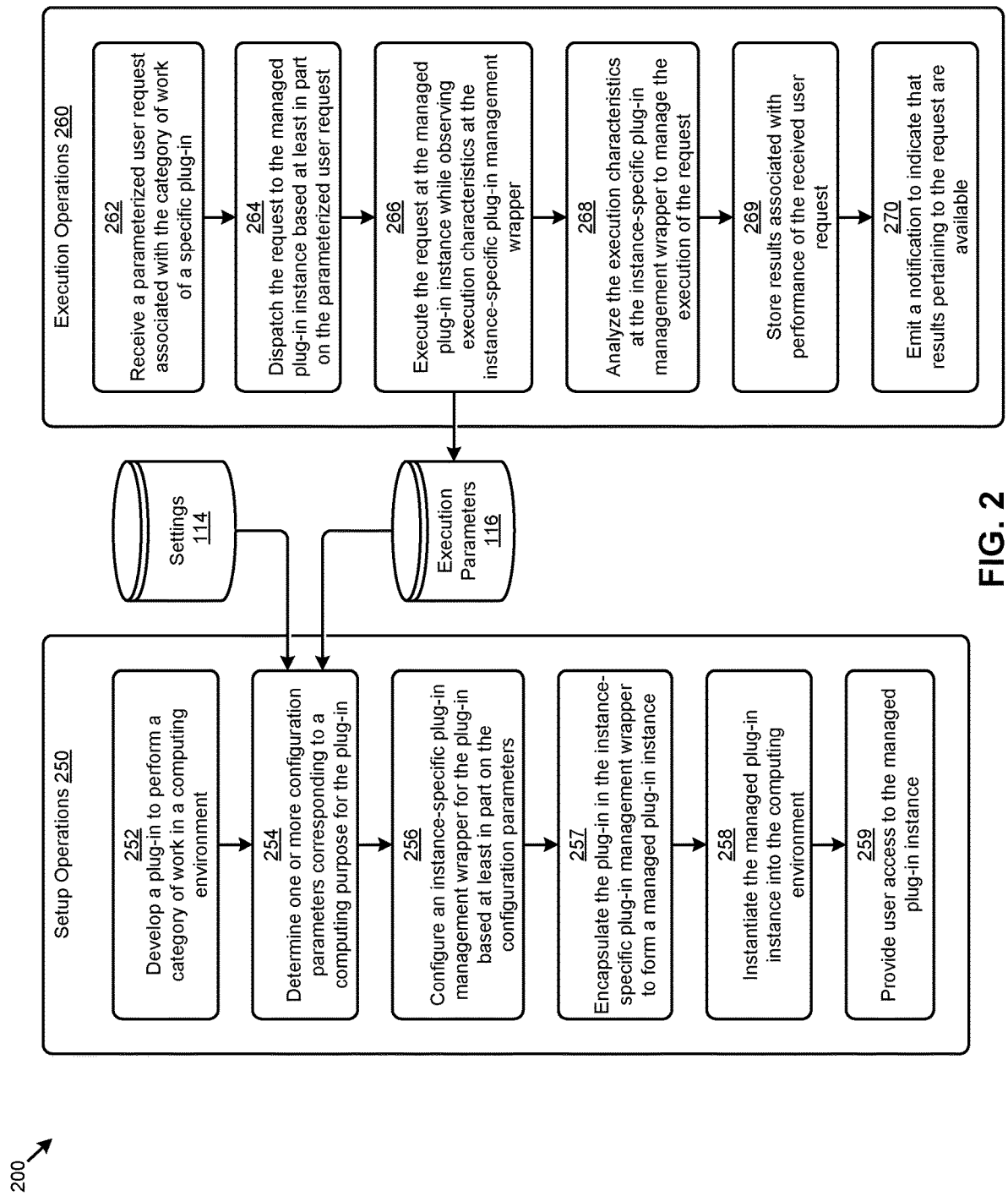
FIG. 2 presents a fine-grained plug-in management technique as implemented in systems that facilitate instantiation of plug-ins with instance-specific plug-in management wrappers, according to an embodiment.

A technique for performing fine-grained plug-in management is disclosed in further detail and as shown in FIG. 2.

FIG. 2 presents a fine-grained plug-in management technique 200 as implemented in systems that facilitate instantiation of plug-ins with instance-specific plug-in management wrappers. As an option, one or more variations of fine-grained plug-in management technique 200 or any aspect thereof may be implemented in the context of the architecture and functionality of the embodiments described herein. The fine-grained plug-in management technique 200 or any aspect thereof may be implemented in any environment.

The fine-grained plug-in management technique 200 presents one embodiment of certain steps and/or operations that instantiate plug-ins with instance-specific plug-in management wrappers in computing environments to facilitate fine-grained plug-in management. As shown, the steps and/or operations can be grouped in a set of setup operations 250 and a set of execution operations 260.

As illustrated, the setup operations 250 can commence by developing a plug-in to perform a category of work in a computing environment (step 252). One or more configuration parameters corresponding to a particular computing purpose for the plug-in are determined (step 254). For example, such configuration parameters might be derived from a set of administrative and/or developer settings 114 (e.g., established by an administrator or a developer) and/or a set of execution parameters 116 (e.g., derived from historical plug-in performance characteristics). The configuration parameters are used to configure an instance-specific plug-in management wrapper for the plug-in (step 256). Since the configuration parameters correspond to the computing purpose identified for the plug-in, the instance-specific plug-in management wrapper is configured for the computing purpose. The plug-in is then encapsulated in the instance-specific plug-in management wrapper to form a managed plug-in instance (step 257). The managed plug-in instance is instantiated into the computing environment (step 258) for access by one or more users (step 259).

The execution operations 260 can commence with receiving a request associated with the category of work of the plug-in (step 262). The request may comprise parameters that are associated with the category of work of the specific plug-in. The request is forwarded to an agent that configures a managed plug-in instance based at least in part on request parameters associated with the request (step 264). In some cases, the managed plug-in instance is already instantiated and running in the computing environment when the request is forwarded. In other cases, instantiation of the managed plug-in instance is invoked by operations responsive to forwarding the request. The request is executed at the managed plug-in instance while observing execution characteristics (e.g., performance characteristics, resource usage characteristics, etc.) at the instance-specific plug-in management wrapper of the managed plug-in instance (step 266).

The execution characteristics (e.g., execution performance characteristics, execution resource usage characteristics, etc.) comprise data records that hold information pertaining to detected events and/or measured observations that characterize the execution of a particular request at a particular managed plug-in instance. For example, execution characteristics might comprise data records that describe execution conditions (e.g., managed plug-in instance identifying information, request parameters, time of day, computing node loading, etc.), execution resource usage (e.g., CPU usage, bandwidth usage, execution time, latency, etc.), and/or other characteristics.

As shown, observing events and/or taking measurements during the execution of the particular managed plug-in instance facilitates generation of execution parameters 116 that can be used to adjust the configuration of the instance-specific plug-in management wrapper of a later instantiation of the managed plug-in instance. Further, the execution characteristics are analyzed at the instance-specific plug-in management wrapper to manage the execution of the request (step 268). For example, one or more of the execution characteristics might indicate that the request is not being processed at a rate that is compliant with the particular request type (e.g., an on-demand preview of a content object). In this case, the instance-specific plug-in management wrapper might issue instructions that request additional instantiations of the managed plug-in instance to share the processing of the request. The managed plug-in instance (or instances) will invoke operations to store a result (step 269) and emit a notification associated with the request (step 270).

Figure 3:
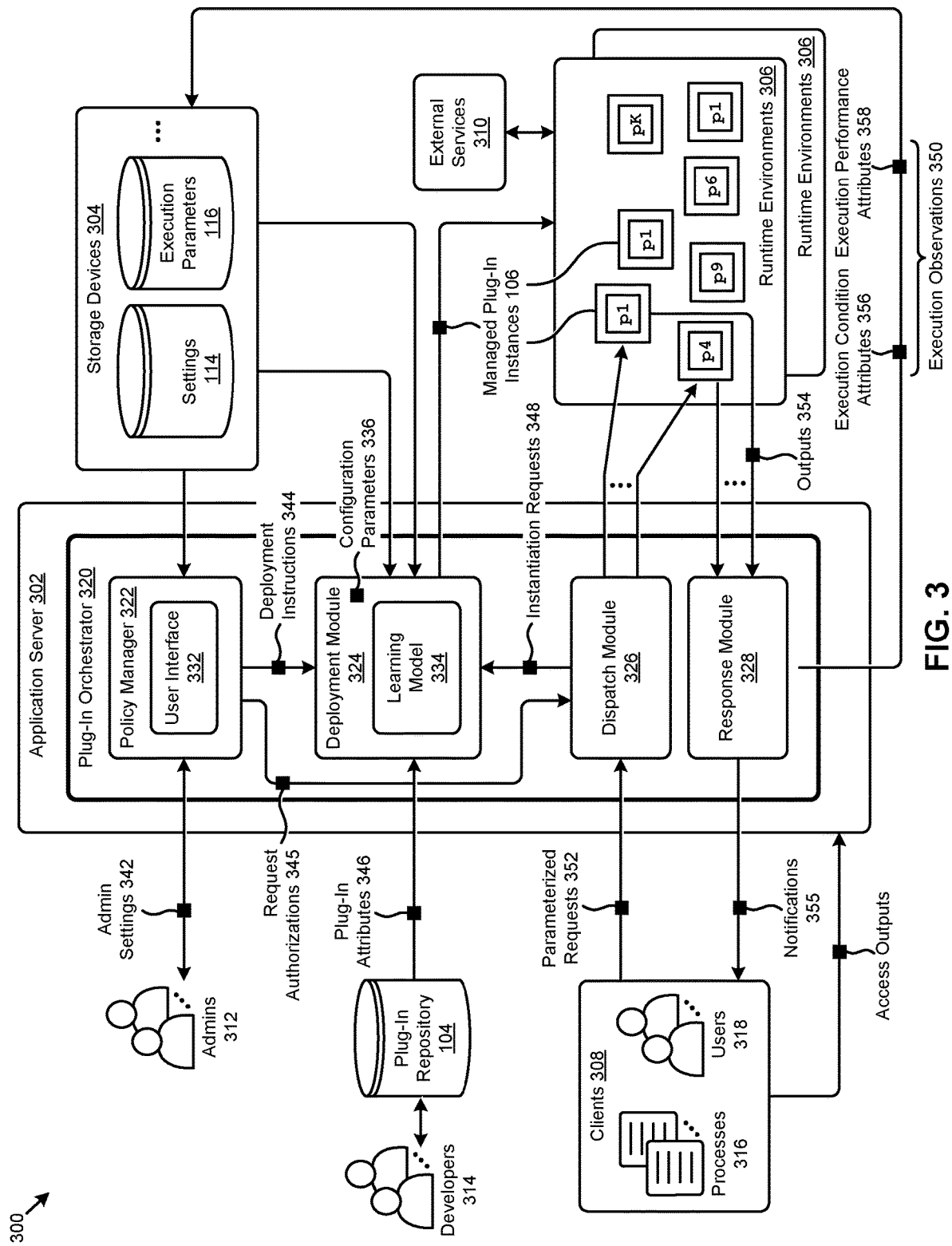
FIG. 3 is a block diagram of a system that supports instantiation of plug-ins with instance-specific plug-in management wrappers to facilitate fine-grained plug-in management, according to an embodiment.

A system for implementing any of the herein disclosed techniques is disclosed as pertains to FIG. 3.

FIG. 3 is a block diagram 300 of a system that supports instantiation of plug-ins with instance-specific plug-in management wrappers to facilitate fine-grained plug-in management. As an option, one or more variations of block diagram 300 or any aspect thereof may be implemented in the context of the architecture and functionality of the embodiments described herein. The block diagram 300 or any aspect thereof may be implemented in any environment.

The embodiment shown in FIG. 3 is merely one example of a system that supports instantiation of plug-ins with instance-specific plug-in management wrappers according to the herein disclosed techniques. The components, data structures, and data flows shown in FIG. 3 present one partitioning and associated data manipulation approach. The specific example shown is purely exemplary, and other subsystems and/or partitioning are reasonable.

The system comprises a representative instance of an application server 302, a set of storage devices 304, and a plurality of runtime environments 306. As shown, a plug-in orchestrator 320 operating at the application server 302 can comprise a policy manager 322. The policy manager 322 performs various operations pertaining to application of certain policies to the deployment and execution of managed plug-in instances. Specifically, and as shown, the policy manager 322 can issue one or more deployment instructions 344 to a deployment module 324 in the plug-in orchestrator 320. The policy manager might also provide request authorizations 345 to a dispatch module 326 at the plug-in orchestrator 320. Deployment instructions 344, request authorizations 345, and/or other outputs of policy manager 322 can be based at least in part on administrative and/or developer settings 114 that are stored in storage devices 304. In the embodiment of FIG. 1, a user interface 332 at policy manager 322 facilitates capture of admin settings 342 from one or more admins 312. The admin settings 342 established by administrators can be used to establish setting values and/or preferences that are stored as administrative and/or developer settings 114. For example, one of the admins 312 might enter certain admin settings to facilitate configuration of an instance-specific plug-in management wrapper.

The deployment module 324 uses the deployment instructions 344, the plug-in attributes 346 (e.g., from the plug-in repository 104), and/or other information to instantiate a set of managed plug-in instances 106 into the runtime environments 306. Specifically, the deployment module 324 derives certain configuration parameters (e.g., configuration parameters 336) from the foregoing information to configure instance-specific plug-in management wrappers for the managed plug-in instances 106. The deployment instructions 344 might define certain configurations (e.g., from the administrative and/or developer settings 114) that specify execution bounds and constraints that are codified in the instance-specific plug-in management wrappers. The plug-in attributes 346 might be derived from certain developer settings (e.g., resulting from any one or more of the developers 314 interaction with the plug-in repository) that wholly or partially define such plug-in attributes 346 and/or use constraints that are codified in the instance-specific plug-in management wrappers. A learning model 334 at the deployment module 324 might also generate configuration parameters. As an example, learning model 334 can access the execution parameters 116 stored in the storage devices 304 to determine configuration adjustments that are applied to a then-current configuration of a particular instance-specific plug-in management wrapper.

The dispatch module 326 receives one or more parameterized requests 352 from clients 308 (e.g., users 318, processes 316, etc.) that are associated with the categories of work of the managed plug-in instances 106. The dispatch module 326 delivers instantiation requests 348 to the deployment module 324, which in turn dispatches work into one or more of the plurality of runtime environments 306.

In this and other embodiments, the dispatch module 326 analyzes the request parameters from the parameterized requests 352 to identify whether or not there is a managed plug-in instance that is configured for the computing purpose of the request. In some cases, there is already a managed plug-in instance running in a runtime environment. In such cases, the requests or portions thereof are dispatched for execution at the identified managed plug-in instances to produce a set of outputs 354 that are delivered to clients 308 by a response module 328. The response module 328 can store the outputs 354 in any forms or representation to any persistent or non-persistent storage location. When the outputs 354 are available (e.g., stored in the persistent or non-persistent storage locations), then the response module emits notifications 355. The clients then access the outputs by operation of one or more access to or through the application server 302, as shown.

In some cases, the called managed plug-in instance might access certain external services (e.g., external services 310) to fulfill the request. In accordance with the herein disclosed techniques, a set of execution observations 350 pertaining to the execution of the request at a managed plug-in instance are captured by the instance-specific plug-in management wrapper of the managed plug-in instance. As shown, the execution observations 350 might comprise a set of execution condition attributes 356 and a set of execution performance attributes 358. The response module 328 stores the execution observations 350 as execution parameters 116 that are accessed, for example, by learning model 334 to facilitate continuous improvement of the computing task outcomes produced by the managed plug-in instances.

The foregoing discussion describes instance-specific plug-in management wrappers that are implemented in accordance with the herein disclosed techniques. One embodiment of an architecture for such wrappers is disclosed in FIG. 4A and FIG. 4B.

Figure 4A:
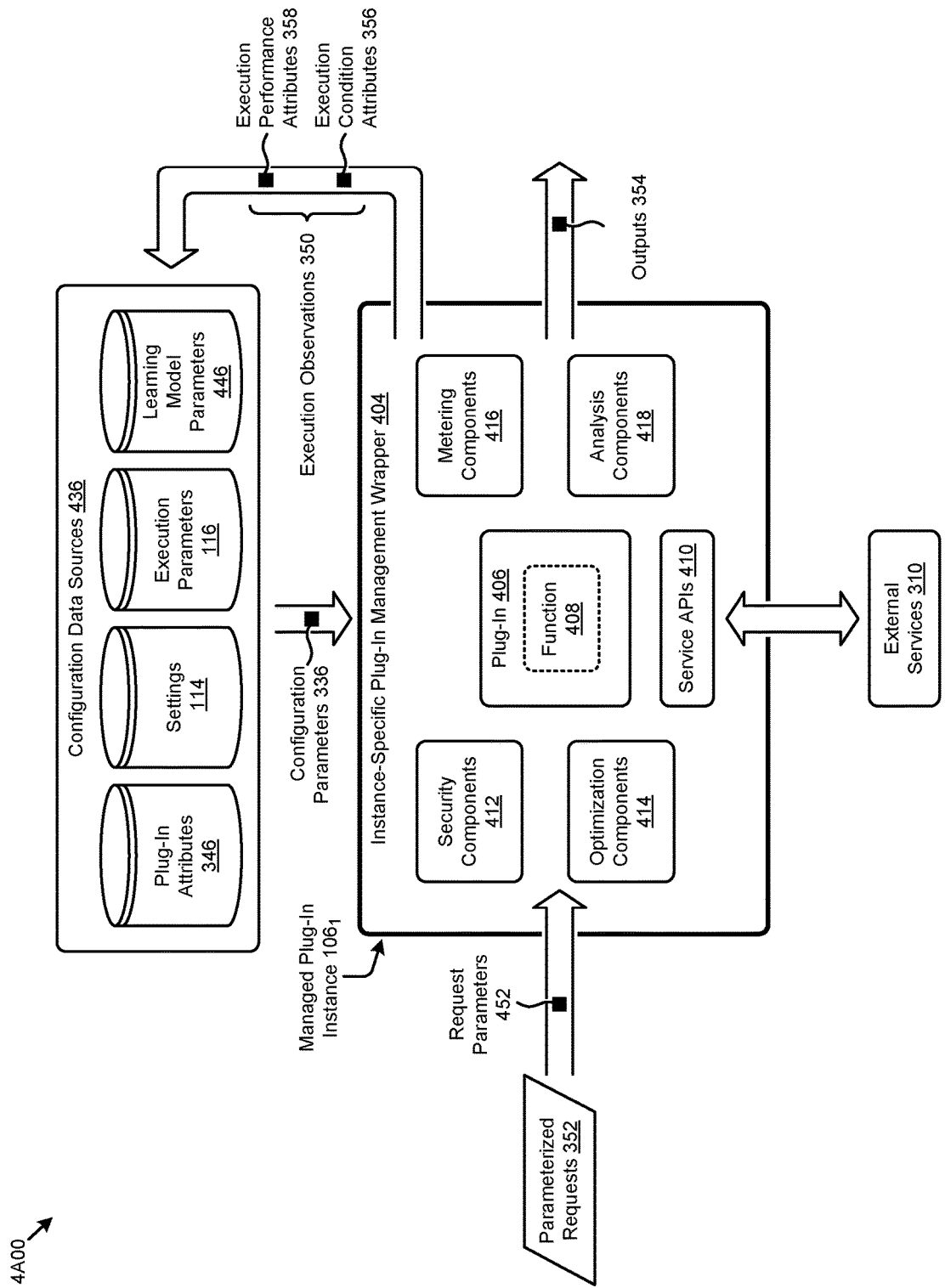
FIG. 4A and FIG. 4B are block diagrams showing an instance-specific plug-in management wrapper as implemented in systems that support instance-specific plug-in management wrappers to facilitate fine-grained plug-in management, according to an embodiment.

FIG. 4A is a block diagram 4A00 showing an instance-specific plug-in management wrapper as implemented in systems that support instance-specific plug-in management wrappers to facilitate fine-grained plug-in management. As an option, one or more variations of block diagram 4A00 or any aspect thereof may be implemented in the context of the architecture and functionality of the embodiments described herein. The components and/or interconnections of block diagram 4A00 or any aspect thereof may be implemented in any environment.

FIG. 4A depicts an instance-specific plug-in management wrapper 404 that encapsulates a plug-in 406 to create a managed plug-in instance $106_1$. As discussed herein, the instance-specific plug-in management wrapper 404 facilitates fine-grained management of the managed plug-in instance $106_1$ in a computing environment. In some cases, for example, the instance-specific plug-in management wrapper 404 can be configured for ephemeral deployment. In such cases, a plug-in (e.g., plug-in 406) is configured to perform specific computing purpose (e.g., a variant of function 408), and then self-terminate. Such ephemeral deployments are facilitated by various components comprising the instance-specific plug-in management wrapper 404.

As can be observed in FIG. 4A, the instance-specific plug-in management wrapper 404 can comprise security components 412 to perform security operations, optimization components 414 to perform performance optimization operations, metering components 416 to perform metering operations, analysis components 418 to perform analysis operations, service application programming interfaces (APIs) such as service APIs 410 to execute one or more calls to external services 310, and/or other components.

The components of the instance-specific plug-in management wrapper 404 are configured based at least in part on configuration parameters 336. The configuration parameters 336 derive from various data sources such as the shown configuration data sources 436 and/or such as the plug-in attributes 346, and/or such as the administrative and/or developer settings 114, and/or such as the execution parameters 116, and/or such as the learning model parameters 446, and/or from other data sources. As an example, plug-in attributes 346 might include a minimum usage pricing level (e.g., specified by the plug-in developer) that is codified in metering components 416 during the configuration process. An administrator might also specify (and pay for) a high security level for certain plug-ins, which can influence the configuration of the security components 412. A target processing unit (e.g., CPU, GPU, etc.) for a particular managed plug-in instance might also be determined from the execution parameters 116 and/or the learning model parameters 446 to be applied to the configuration of the optimization components 414. The service APIs 410 might comprise collaboration system APIs, content object APIs, metadata APIs, representation APIs, and/or other APIs. Other configuration parameters and associated configuration actions are possible. Configuration parameters and associated configuration actions can be classified as pertaining to administrative capabilities (e.g., to establish pricing models, dollar amounts, etc.), and/or developer capabilities (e.g., target processor type or processor environment requirements, etc.). Additionally, embodiments support a class of configuration parameters that are learned, or derived from learnings from any sets of observations (e.g., current observations or historical observations).

Parameterized requests 352 comprising request parameters 452 are received at the instance-specific plug-in management wrapper 404 of the managed plug-in instance $106i$. While a portion of the request parameters 452 are delivered to plug-in 406, at least some of the request parameters 452 might be directed to one or more of the components in the instance-specific plug-in management wrapper 404. For example, user credentials included in the request parameters 452 might be directed to the security components 412 to establish bounds as to the operations (e.g., calls to external services) that can be performed by the plug-in on behalf of the user. As another example, a timestamp included in the request parameters 452 might be interpreted by the optimization components 414 to throttle certain operations executed at the managed plug-in instance $106_1$ based on the then-current time of day. As can be observed, the outputs produced by the managed plug-in instance $106_1$ include outputs 354, and execution observations 350 (e.g., execution condition attributes 356, execution performance attributes 358, etc.). In some cases, such as when one or more functions of the plugin is implemented using a master/slave task relationship, the managed plug-in instance emits notifications or raises events that in turn trigger additional plug-in instantiation requests. Such instantiation requests can be routed or "chained" to a different managed plug-in instance, or to a deployment module 324.

Figure 4B:
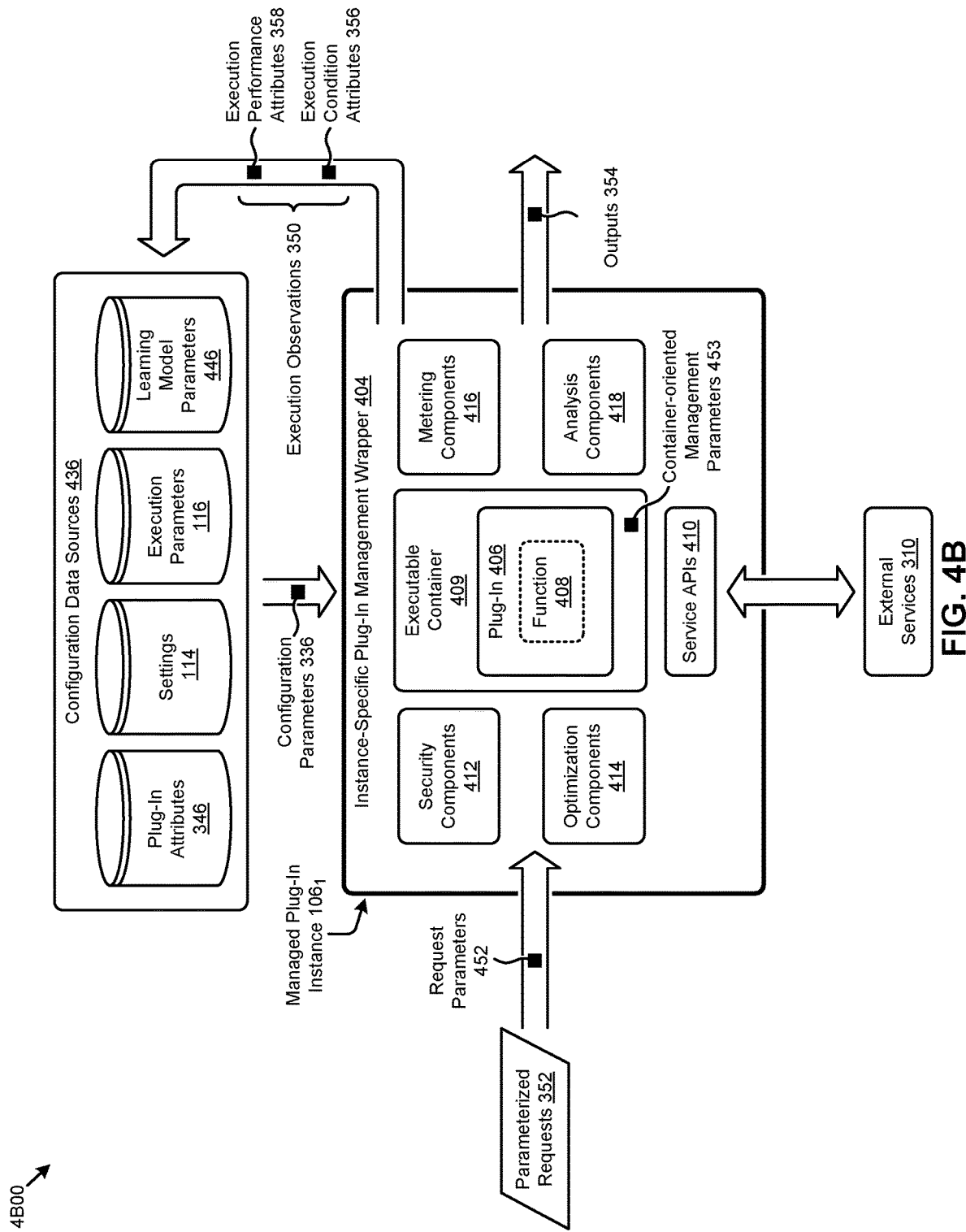

FIG. 4B is a block diagram 4B00 showing an instance-specific plug-in management wrapper as implemented in systems that support instance-specific plug-in management wrappers to facilitate fine-grained plug-in management. As an option, one or more variations of block diagram 4B00 or any aspect thereof may be implemented in the context of the architecture and functionality of the embodiments described herein. The components and/or interconnections of block diagram 4B00 or any aspect thereof may be implemented in any environment.

FIG. 4B depicts an instance-specific plug-in management wrapper 404 that encapsulates an executable container 409, which executable container 409 further encapsulates a plug-in 406 to create a managed plug-in instance 1062. As shown, a function 408 can be encapsulated by a plug-in, which in turn can be encapsulated by an executable container, which in turn can be encapsulated by an instance-specific plug-in management wrapper.

Any instance of an executable container 409 can be executed by a processor to perform a variety of functions. Any instance of an executable container can itself include container-oriented management functions. Such container-oriented management functions can be in addition to any of the management functions of the encapsulating management wrapper. Moreover, such container-oriented management functions can control aspects of function 408.

In some cases, container-oriented management functions of an executable container are configurable using container-oriented management parameters 453, and values of such container-oriented management parameters can derive from any of a set of execution parameters 116, and/or a set of learning model parameters 446, either singly or in combination.

Runnable portions of an executable container instance sometimes derive from an executable image, which in turn might include all, or portions of any of, a Java archive repository (JAR) and/or its contents, and/or a script or scripts and/or a directory of scripts, and/or a virtual machine configuration, and may further include any dependencies therefrom.

In some cases, start-up time for an executable container instance can be much faster than start-up time for other executables such as, for example, a virtual machine instance, at least inasmuch as the executable container image might be much smaller or faster than the alternative executable. In some cases, an instance-specific plug-in management wrapper 404 can determine the specific availability and applicability of an executable container to be used in lieu of any other sort of executable item to carry out function 408. Moreover, operational components of an instance-specific plug-in management wrapper 404 can serve to configure an executable container instance to correspond to an instance configuration based at least in part on request parameters 452.

The executable container might include operating system components that can be composed of a runnable instance that is built (e.g., through compilation and linking, or just-in-time compilation, etc.) to include all of the library and OS-like functions needed for execution of the runnable instance. In some cases, a runnable instance can be built with interfaces to any number of I/O devices, and/or with interfaces to any of a variety of data IO management functions, etc. In some environments, multiple executable containers can be co-located in the same computing context. Strictly as one example, multiple executable containers that share particular code components or other characteristics (e.g. access to a particular I/O device) can be assembled into a pod (e.g., a Kubernetes pod), which pod in in turn encapsulated by an instance-specific plug-in management wrapper.

In some cases, an instance of an executable container can be configured for ephemeral deployment. In such cases, an executable container is configured to perform for a specific computing purpose (e.g., a variant of function 408), and then self-terminate.

Figure 5:
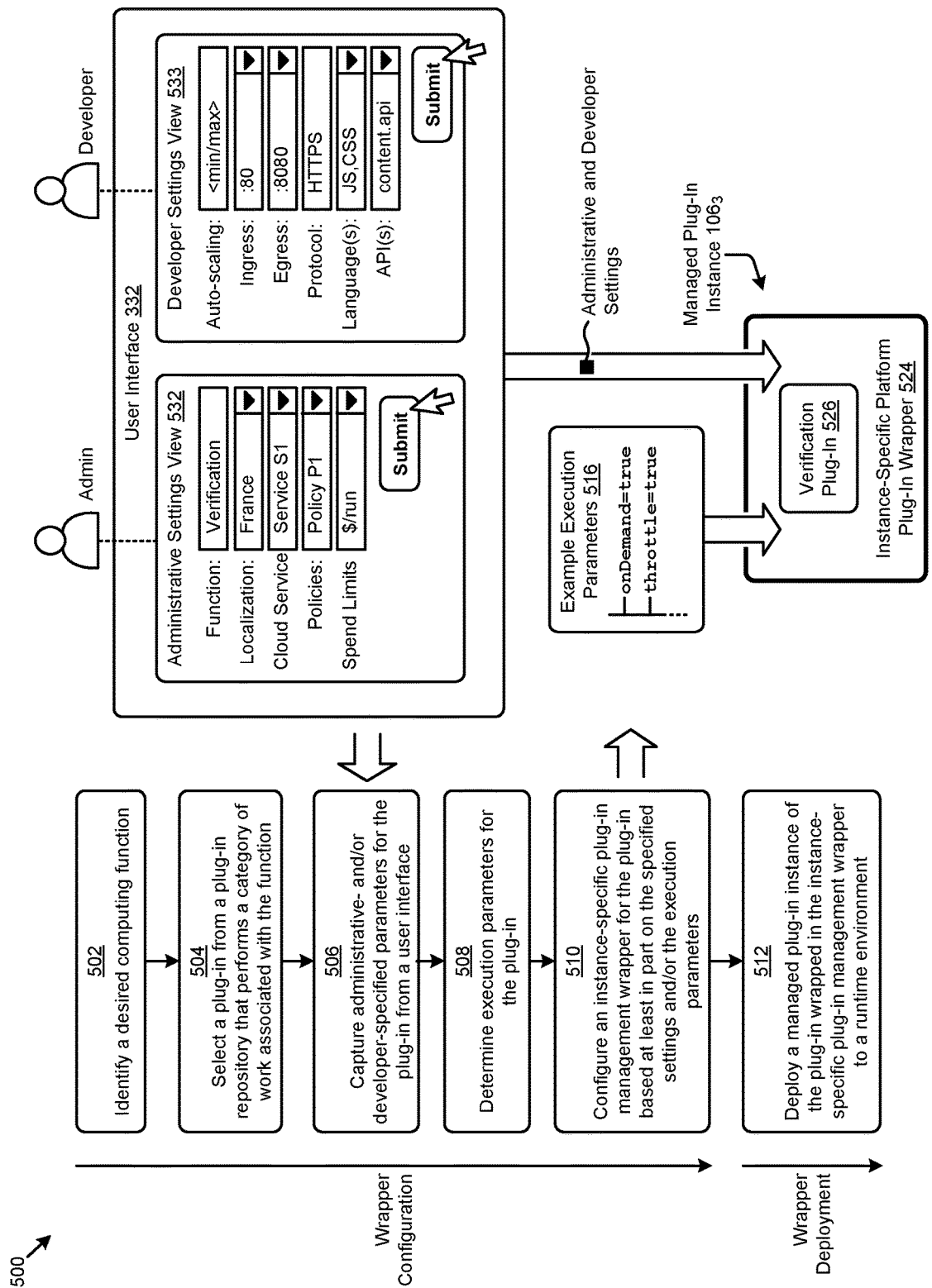
FIG. 5 presents a plug-in management wrapper configuration technique, according to an embodiment.

The foregoing discussions of FIG. 4A and FIG. 4B includes techniques for configuration variations of instance-specific plug-in management wrappers, some of which configuration techniques are disclosed in further detail in FIG. 5.

FIG. 5 presents a plug-in management wrapper configuration technique 500. As an option, one or more variations of plug-in management wrapper configuration technique 500 or any aspect thereof may be implemented in the context of the architecture and functionality of the embodiments described herein. The plug-in management wrapper configuration technique 500 or any aspect thereof may be implemented in any environment.

The plug-in management wrapper configuration technique 500 presents one embodiment of certain steps and/or operations for configuration of instance-specific plug-in management wrappers as implemented according to the herein disclosed techniques. Certain example illustrations are also shown to further describe the plug-in management wrapper configuration technique 500.

As shown, the plug-in management wrapper configuration technique 500 can commence by identifying a desired computing function (step 502). For example, at step 504, an administrator (e.g., admin) might select a plug-in pertaining to a credential verification platform. Applicable parameters can be established.

For example, and as illustrated in FIG. 5, the admin might access an administrative settings view 532 in a user interface 332 to specify "Verification" in a "Function" form field. A plug-in from a plug-in repository that performs the particular category of work associated with the computing function is selected.

At step 506, any further applicable administrative- and/or developer-specified parameter values pertaining to the selected plug-in can be established. As shown, a developer settings view 533 might be presented for interaction with a user with developer credentials. Developer settings can be defined using screen devices of the shown user interface 332. For example, settings might pertain to auto-scaling, ingress ports, egress ports, permitted or preferred protocols, permitted languages, APIs etc.

The plug-in management wrapper configuration technique 500 further determines certain execution parameters for the plug-in (step 508). As an example, when the admin clicks "Submit" at the user interface 332, certain then-current execution parameters might be collected from a learning model. As shown in the example execution parameters 516, such execution parameters might indicate that the plug-in can spin down when not in use (e.g., "onDemand=true"), the plug-in processing can be throttled (e.g., "throttle=true"), and/or other plug-in execution behaviors. An instance-specific plug-in management wrapper (e.g., instance-specific platform plug-in wrapper 524) is configured based at least in part on the administrative and/or developer settings and/or based at least in part on the execution parameters (step 510). In the example shown, the aforementioned verification function is instanced as a verification plug-in 526 that is wrapped by the instance-specific platform plug-in wrapper 524.

The resulting managed plug-in instance (e.g., managed plug-in instance 106₃) is deployed to a runtime environment (step 512).

When managed plug-in instances are deployed to a runtime environment according to the herein disclosed techniques, they can be called to perform their respective computing functions. Examples of managed plug-in instance execution scenarios are disclosed in detail as shown in FIG. 6A and FIG. 6B.

Figure 6A:
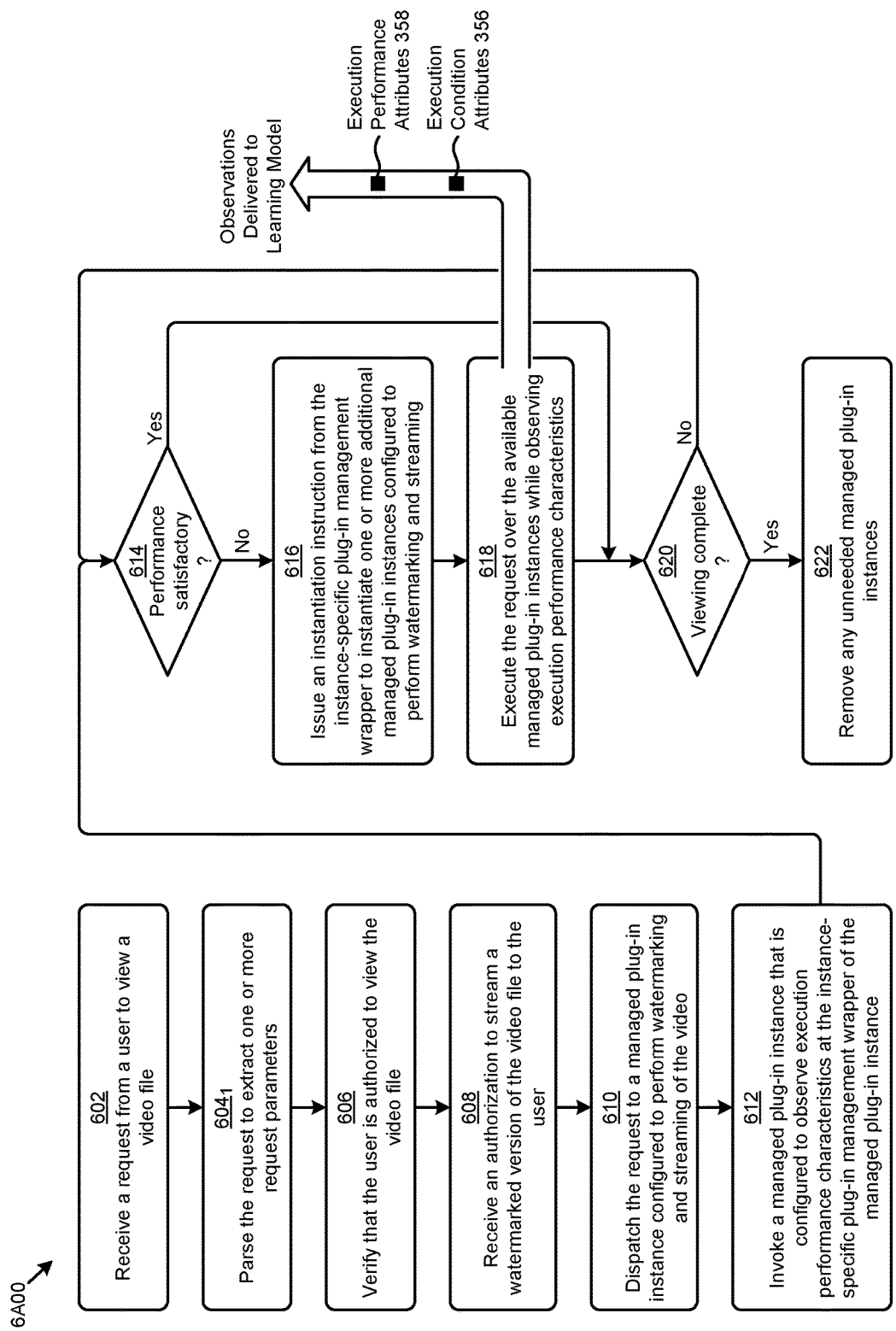
FIG. 6A depicts a managed plug-in performance feedback technique as implemented in systems that support instantiation of plug-ins with instance-specific plug-in management wrappers to facilitate fine-grained plug-in management, according to an embodiment.
Figure 6B:
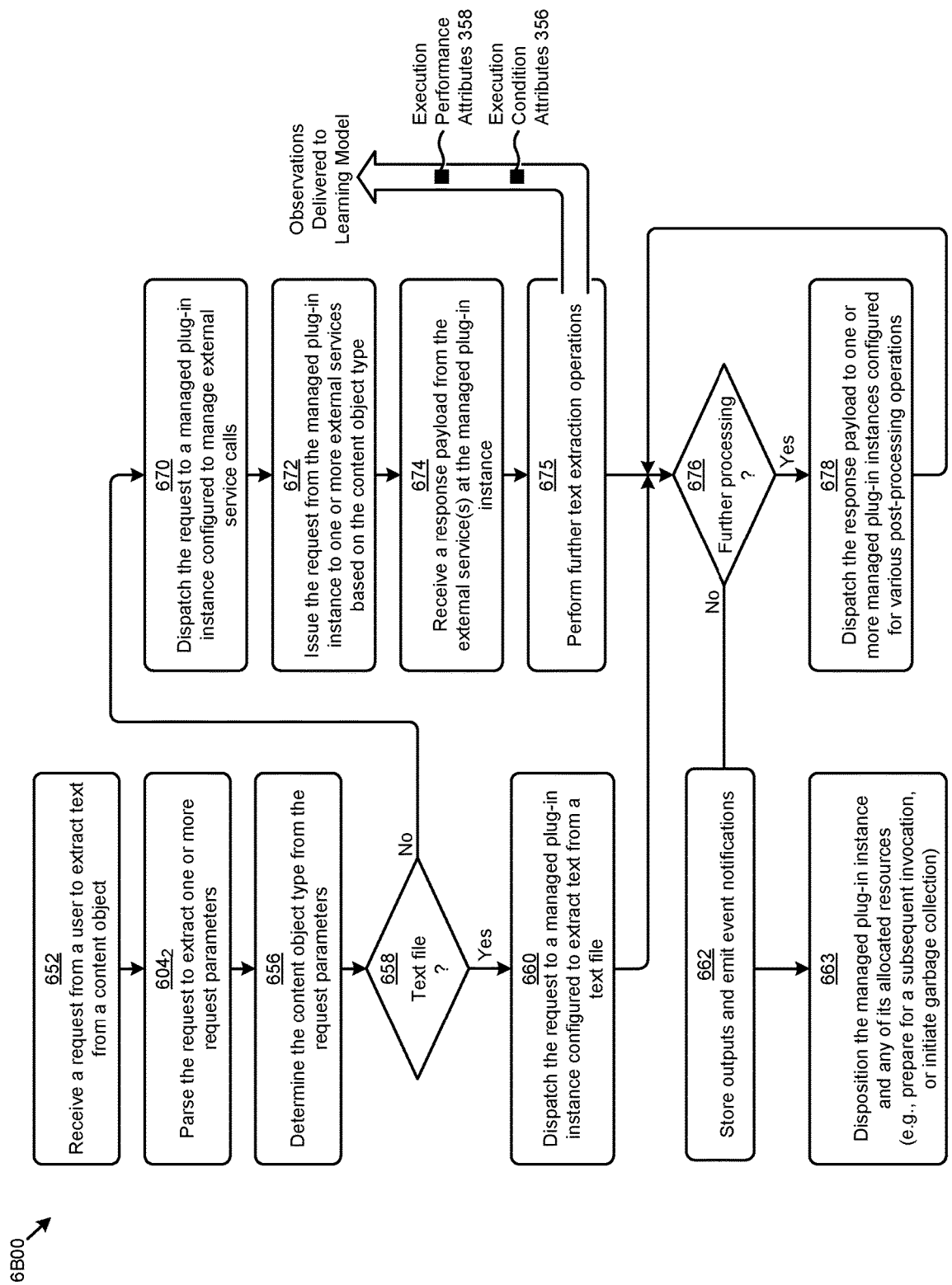
FIG. 6B depicts a managed plug-in call dispatching technique as implemented in systems that support instantiation of plug-ins with instance-specific plug-in management wrappers to facilitate fine-grained plug-in management, according to an embodiment.

FIG. 6A depicts a managed plug-in performance feedback technique 6A00 as implemented in systems that support instantiation of plug-ins with instance-specific plug-in management wrappers to facilitate fine-grained plug-in management. As an option, one or more variations of managed plug-in performance feedback technique 6A00 or any aspect thereof may be implemented in the context of the architecture and functionality of the embodiments described herein. The managed plug-in performance feedback technique 6A00 or any aspect thereof may be implemented in any environment.

The managed plug-in performance feedback technique 6A00 presents one embodiment of certain steps and/or operations that describe an example video file streaming scenario that uses managed plug-in instances as implemented in accordance with the herein disclosed techniques. As shown, the managed plug-in performance feedback technique 6A00 can commence by receiving a request for a user to view a video file (step 602). The request is parsed to extract one or more request parameters (step 604₁). Authorization of the user to view the video file is verified (step 606). For example, user credentials included in the request parameters might be issued to a policy manager to verify that the user is authorized to view the video file. The policy manager might issue a response that indicates the user is authorized to view the video file, but that the video file is to be watermarked before presentation to the user (step 608). The request is then dispatched to a managed plug-in instance that is configured to perform watermarking and streaming of the watermarked video (step 610). Example policies include, a policy to limit user authorizations (e.g., for use of a GPU or other hardware or software resources), a policy to limit resource allocation (e.g., an amount of memory or a number of CPUs, etc.), a policy to limit spending, a policy to limit a number of concurrent master tasks, a policy to limit a number of concurrent slave tasks, etc.

In one usage scenario, the managed plug-in instance might comprise a general-purpose video streaming plug-in that is managed by its respective instance-specific plug-in management wrapper to perform watermarking while streaming. More specifically, the managed plug-in instance might be configured to access high performance computing resources and external video watermarking services to perform a first computing function (e.g., watermarking), while a different managed plug-in performs a different computing function (e.g., video streaming). The request is executed at the managed plug-in instance while making execution observations at the instance-specific plug-in management wrapper of the managed plug-in instance (step 612).

Specifically, certain performance metrics (e.g., buffer fill, lag length, etc.) can be tracked at the instance-specific plug-in management wrapper. If one or more metrics breach a respective threshold such that performance is no longer satisfactory ("No" path of decision 614), then an instantiation instruction is issued from the instance-specific plug-in management wrapper to instantiate one or more additional managed plug-in instances that are configured to perform watermarking and streaming of the watermarked video (step 616). The request is then executed over the available managed plug-in instances (e.g., the original instance and any additional instances) while observing execution performance characteristics (step 618) and codifying such observations into a set of execution condition attributes 356 and a set of execution performance attributes 358 that are sent to a learning model.

If performance is satisfactory ("Yes" path of decision 614), no additional managed plug-in instances are deployed. While viewing is not complete ("No" path of decision 620), execution performance is continually checked (decision 614) using the observations from the instance-specific plug-in management wrappers of the active managed plug-in instances. When viewing is complete ("Yes" path of decision 620), any idle managed plug-in instances configured for watermarking and/or streaming of the watermarked video are retained in its idle/pending mode or removed/destroyed (step 622). The state of the managed plug-in can be queried at any time by a predictive scheduler. A predictive scheduler can dispatch to an available idle instance (e.g., to satisfy a work request), or can force removal/destruction of an instance.

FIG. 6B depicts a managed plug-in call dispatching technique 6B00 as implemented in systems that support instantiation of plug-ins with instance-specific plug-in management wrappers to facilitate fine-grained plug-in management. As an option, one or more variations of managed plug-in call dispatching technique 6B00 or any aspect thereof may be implemented in the context of the architecture and functionality of the embodiments described herein. The managed plug-in call dispatching technique 6B00 or any aspect thereof may be implemented in any environment.

The managed plug-in call dispatching technique 6B00 presents one embodiment of certain steps and/or operations that describe an example content object textualization scenario that uses managed plug-in instances as implemented in accordance with the herein disclosed techniques. As shown, the managed plug-in call dispatching technique 6B00 can commence by receiving a request for a user to extract text from a content object (step 652). The request is parsed to extract one or more request parameters (step 604₂). The content object type is determined from the request parameters (step 656). If the content object is a text file ("Yes" path of decision 658), the request is dispatched to a managed plug-in instance that is configured to extract text from a text file (step 660). As an example, such a managed plug-in instance might be available in a local runtime environment.

If the content object is not a text file ("No" path of decision 658), the request is dispatched to a managed plug-in instance that is configured to manage external service calls (step 670). For example, the managed plug-in instance to manage external service calls might be implemented in a local runtime environment, whereas the services to perform the textualization of the content object might be external to the local runtime environment. The request is then issued from the managed plug-in instance to one or more external services based on the content object type (step 672). A response payload (e.g., the text extracted from the content object) is received at the managed plug-in instance from the external service(s) (step 674) and then stored in an appropriate location (e.g., in local or remote storage, etc.) and in an appropriate representation (e.g., as metadata, or as an API parameter, etc.). Further text extraction operations are performed (step 675), during which processing observations are taken and sent to a learning model.

In some cases, further processing of the request might be desired, whether the textualization was performed by a managed plug-in instance or an external service. For example, the extracted text and/or the content object might be categorized, classified, analyzed for viruses, analyzed for sentiment, or otherwise processed. If further processing is desired ("Yes" path of decision 676), the response payload is stored in the appropriate form (e.g., as metadata, as parameters of an API call, etc.) and an event is emitted for a notification manager to propagate. In some cases, emitting an event might trigger one or more managed plug-in instances configured for various post-processing operations (step 678). When no further processing is desired ("No" path of decision 676), at step 662, any outputs (e.g., response payload) are stored and the requestor is notified of the completion of the request and/or availability of outputs from the work performed in response to the request.

Additionally, the managed plug-in instance might be processed (at step 663) for a subsequent invocation, or might self-terminate, or might become marked as ready for garbage collection, etc. Such post-execution processing may depend on wholly or in part on characteristics of the deployment manager's predictive scheduling configuration.

Additional Embodiments of the Disclosure

Additional Practical Application Examples

Figure 7:
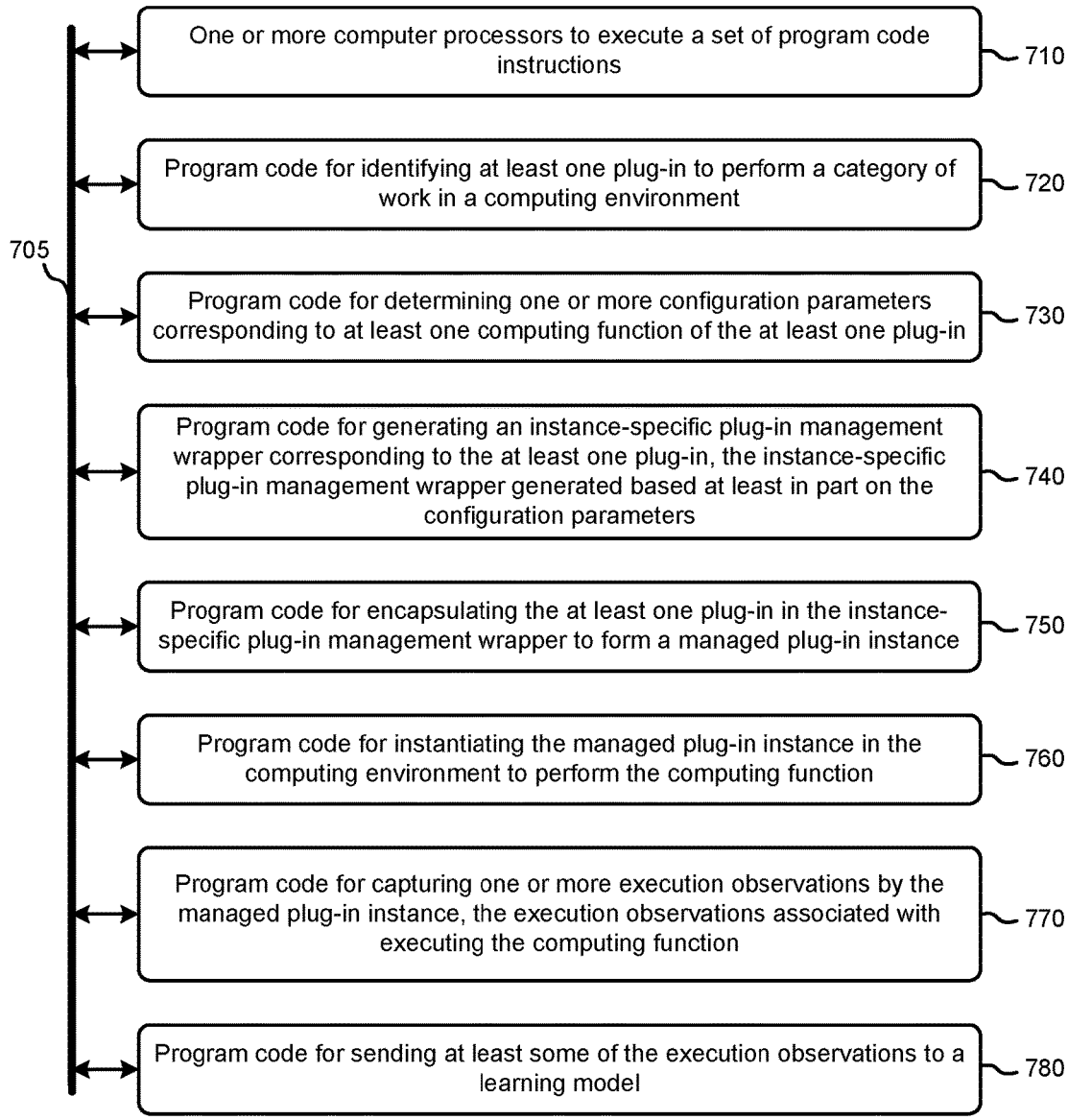
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address fine-grained management of plug-in instances that are deployed in a computing environment. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying at least one plug-in to perform a particular category of work in a computing environment (module 720); determining one or more configuration parameters corresponding to at least one computing function of the at least one plug-in (module 730); generating an instance-specific plug-in management wrapper corresponding to the at least one plug-in, the instance-specific plug-in management wrapper generated based at least in part on the configuration parameters (module 740); encapsulating the at least one plug-in in the instance-specific plug-in management wrapper to form a managed plug-in instance (module 750); instantiating the managed plug-in instance in the computing environment to perform the computing function (module 760); capturing one or more execution observations by the managed plug-in instance, the execution observations being associated with executing the computing function (module 770); and sending at least some of the execution observations to a learning model (module 780).

Variations of the foregoing may include more or fewer of the shown modules. Certain variations may perform more or fewer (or different) steps, and/or certain variations may use data elements in more or in fewer (or different) operations.

System Architecture Overview

Additional System Architecture Examples

Figure 8A:
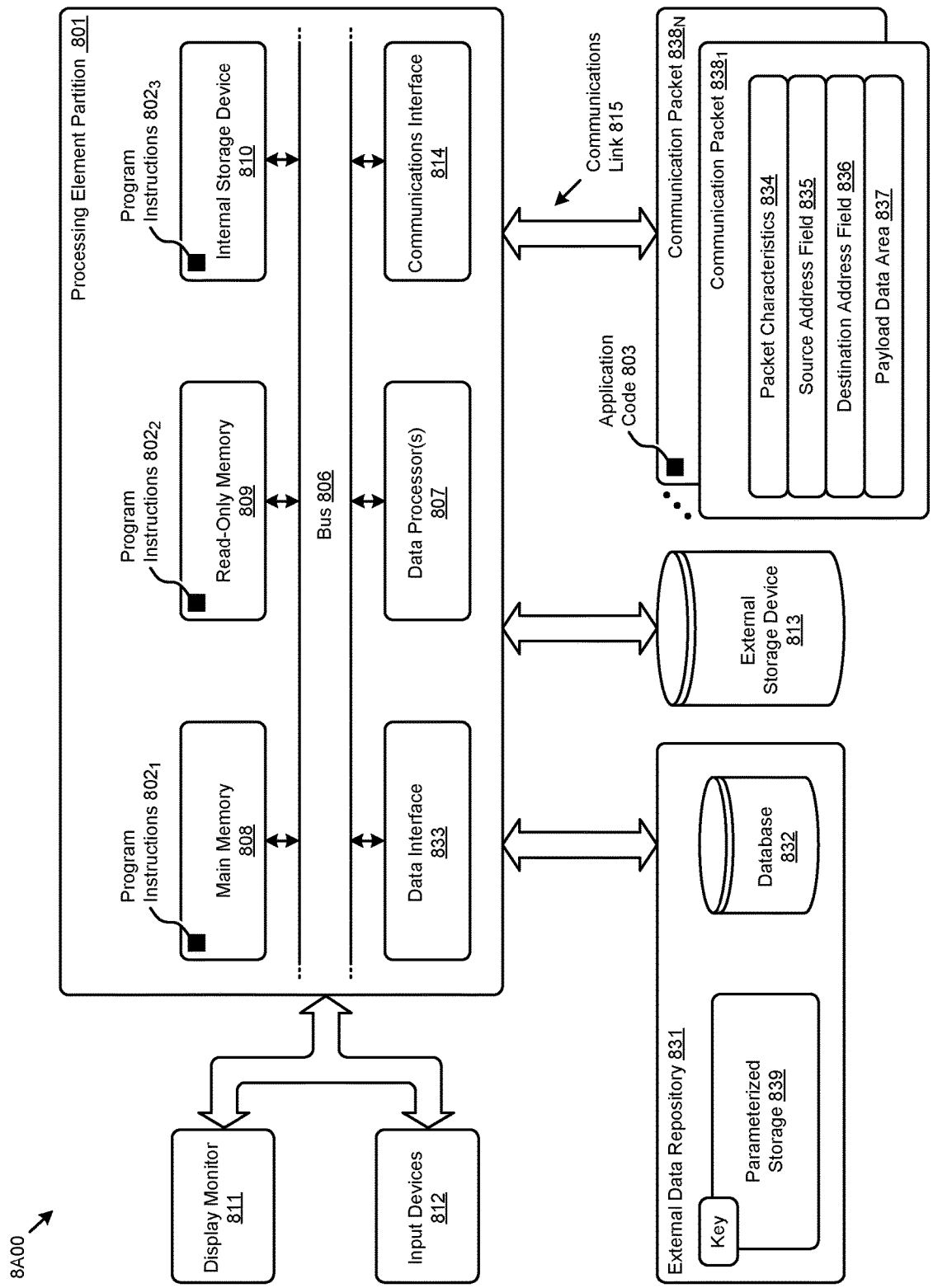
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to instantiation of plug-ins with instance-specific plug-in management wrappers to facilitate fine-grained plug-in management. A module may include one or more state machines and/or combinational logic used to implement or facilitate the operational and/or performance characteristics pertaining to instantiation of plug-ins with instance-specific plug-in management wrappers to achieve fine-grained plug-in management.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of instantiation of plug-ins with instance-specific plug-in management wrappers to facilitate fine-grained plug-in management). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to instantiation of plug-ins with instance-specific plug-in management wrappers to facilitate fine-grained plug-in management, and/or for improving the way data is manipulated when performing computerized operations pertaining to encapsulating a plug-in with an instance-specific plug-in management wrapper to form a managed plug-in instance that is instantiated in a computing environment in a manner that achieves continuous improvements in computing task outcomes.

Figure 8B:
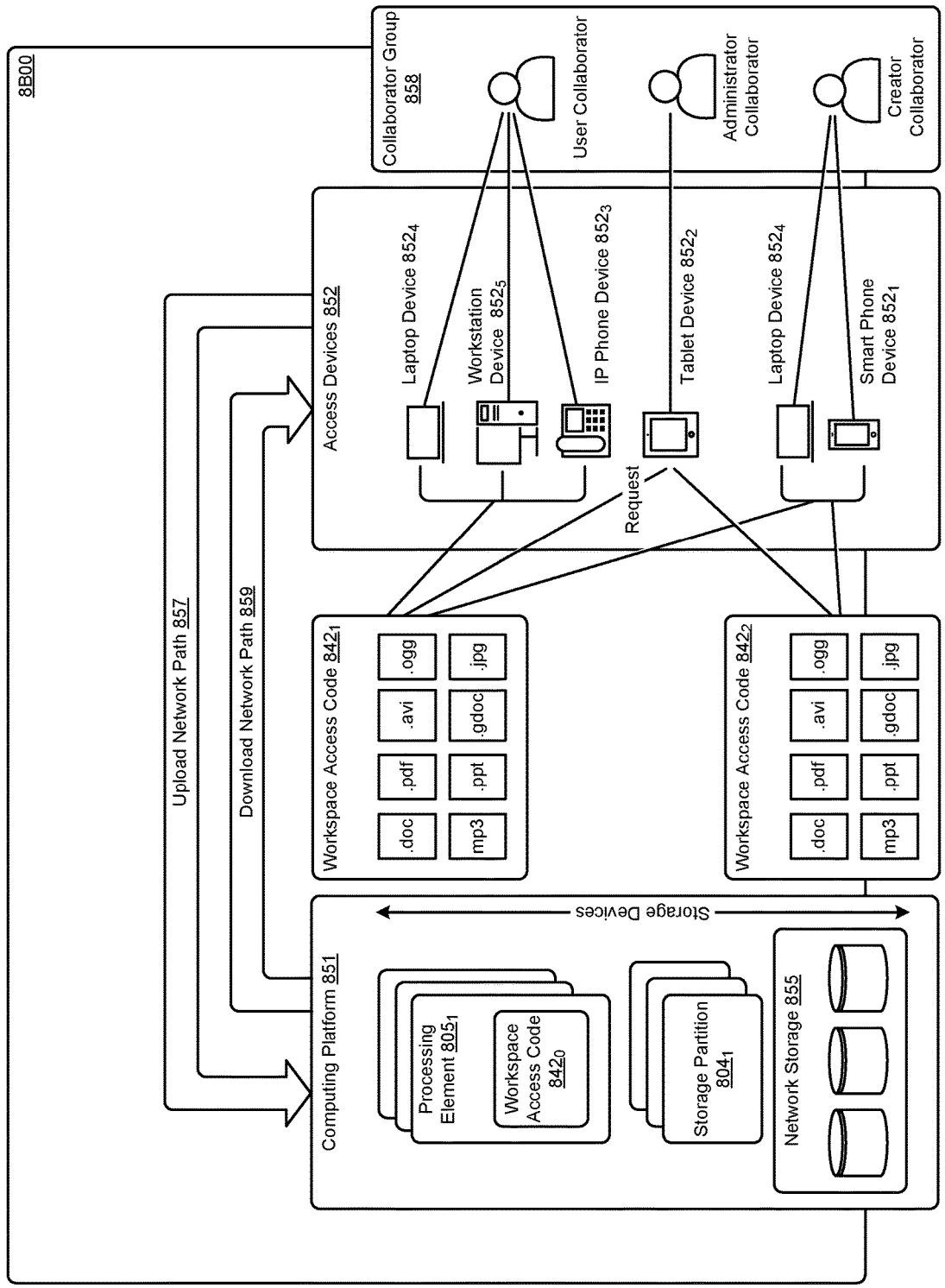

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device 852₁, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 805₁). The workspace access code can interface with storage devices such as networked storage 855. Storage of workspaces and/or any constituent files or objects, and/or any other code or scripts or data can be stored in any one or more storage partitions (e.g., storage partition 804₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method of configuring plug-in management wrapper in a computing system, the method comprising:
   identifying at least one plug-in to perform at least one computing function in a computing environment, wherein the at least one plug-in is an existing plug-in that is capable of executing in the computing environment to perform the at least one computing function;
   determining one or more configuration parameters corresponding to the at least one computing function of the at least one plug-in, wherein a learning model generates the one or more configuration parameters by determining a configuration adjustment;
   generating an instance-specific plug-in management wrapper corresponding to the at least one plug-in, the instance-specific plug-in management wrapper being generated based at least in part on the one or more configuration parameters;
   encapsulating the at least one plug-in in the instance-specific plug-in management wrapper to form a managed plug-in instance in the computing environment, wherein the instance-specific plug-in management wrapper collects execution observations during execution of the managed plug-in instance in the computing environment and performs analysis over the execution observations to manage execution of the managed plug-in instance, and wherein the execution observations are used by the learning model to manage the plug-in instance by modifying a configuration of management functionality for the instance-specific plug-in management wrapper; and
   deploying the plug-in management wrapper having the plug-in in the computing system.

2. The method of claim 1, further comprising:
   instantiating the managed plug-in instance in the computing environment to perform the at least one computing function.

3. The method of claim 2, further comprising:
   receiving at least one request associated with a category of work, the request comprising one or more request parameters;
   dispatching the request to the managed plug-in instance, the request being dispatched based at least in part on one or more of the request parameters; and
   executing the request by the managed plug-in instance.

4. The method of claim 3, further comprising generating the one or more configuration parameters based at least in part on the execution observations.

5. The method of claim 3, further comprising:
   storing outputs pertaining to execution the request by the managed plug-in instance; and
   emitting a notification that the outputs are available in a stored location.

6. The method of claim 3, wherein the request is invoked by at least one of, a user, or a process.

7. The method of claim 2, wherein one or more of the configuration parameters are specified by a user.

8. The method of claim 2, wherein one or more of the configuration parameters are determined based at least in part on one or more instantiations of the managed plug-in instance.

9. The method of claim 2, wherein one or more of the configuration parameters are derived from one or more learning model parameters corresponding to at least one learning model.

10. The method of claim 2, wherein the at least one plug-in is encapsulated by an executable container.

11. The method of claim 2, wherein the instance-specific plug-in management wrapper comprises at least one of, one or more security components to perform one or more security operations, one or more optimization components to perform one or more performance optimization operations, one or more metering components to perform one or more metering operations, one or more analysis components to perform one or more analysis operations, or one or more service APIs to execute one or more calls to one or more external services.

12. A computer readable medium, embodied in a non-transitory computer readable medium, the non-transitory computer readable medium having stored thereon a sequence of instructions which, when stored in memory and executed by one or more processors causes the one or more processors to perform a set of acts for configuring plug-in management wrapper in a computing system, the acts comprising:
   identifying at least one plug-in to perform at least one computing function in a computing environment, wherein the at least one plug is an existing plug-in that is capable of executing in the computing environment to perform the at least one computing function;

determining one or more configuration parameters corresponding to the at least one computing function of the at least one plug-in, wherein a learning model generates the one or more configuration parameters by determining a configuration adjustment;

generating an instance-specific plug-in management wrapper corresponding to the at least one plug-in, the instance-specific plug-in management wrapper being generated based at least in part on the one or more configuration parameters;

encapsulating the at least one plug-in in the instance-specific plug-in management wrapper to form a managed plug-in instance in the computing environment, wherein the instance-specific plug-in management wrapper collects execution observations during execution of the managed plug-in instance in the computing environment and performs analysis over the execution observations to manage execution of the managed plug-in instance, and wherein the execution observations are used by the learning model to manage the plug-in instance by modifying a configuration of management functionality for the instance-specific plug-in management wrapper; and deploying the plug-in management wrapper having the plug-in in the computing system.

13. The computer readable medium of claim 12, further comprising instructions which, when stored in memory and executed by the one or more processors causes the one or more processors to instantiate the managed plug-in instance in the computing environment to perform the at least one computing function.

14. The computer readable medium of claim 13 further comprising instructions which, when stored in memory and executed by the one or more processors causes the one or more processors to perform acts of:

receiving at least one request associated with a category of work, the request comprising one or more request parameters;

dispatching the request to the managed plug-in instance, the request being dispatched based at least in part on one or more of the request parameters; and executing the request by the managed plug-in instance.

15. The computer readable medium of claim 14, further comprising instructions which, when stored in memory and executed by the one or more processors causes the one or more processors to perform acts of generating the one or more configuration parameters based at least in part on the execution observations.

16. The computer readable medium of claim 14, further comprising instructions which, when stored in memory and executed by the one or more processors causes the one or more processors to perform acts of:

storing outputs pertaining to execution the request by the managed plug-in instance; and emitting a notification that the outputs are available in a stored location.

17. A system for configuring plug-in management wrapper in a computing system, the system comprising:

a storage medium having stored thereon a sequence of instructions; and one or more processors that execute the instructions to cause the one or more processors to perform a set of acts, the acts comprising:

identifying at least one plug-in to perform at least one computing function in a computing environment, wherein the at least one plug-in is an existing plug-in that is capable of executing in the computing environment to perform the at least one computing function;

determining one or more configuration parameters corresponding to the at least one computing function of the at least one plug-in, wherein a learning model generates the one or more configuration parameters by determining a configuration adjustment;

generating an instance-specific plug-in management wrapper corresponding to the at least one plug-in, the instance-specific plug-in management wrapper being generated based at least in part on the one or more configuration parameters;

encapsulating the at least one plug-in in the instance-specific plug-in management wrapper to form a managed plug-in instance in the computing environment, wherein the instance-specific plug-in management wrapper collects execution observations during execution of the managed plug-in instance and performs analysis over the execution observations to manage execution of the managed plug-in instance, and wherein the execution observations are used by the learning model to manage the plug-in instance by modifying a configuration of management functionality for the instance-specific plug-in management wrapper; and deploying the plug-in management wrapper having the plug-in in the computing system.

* * * * *